Figures 1, 2:
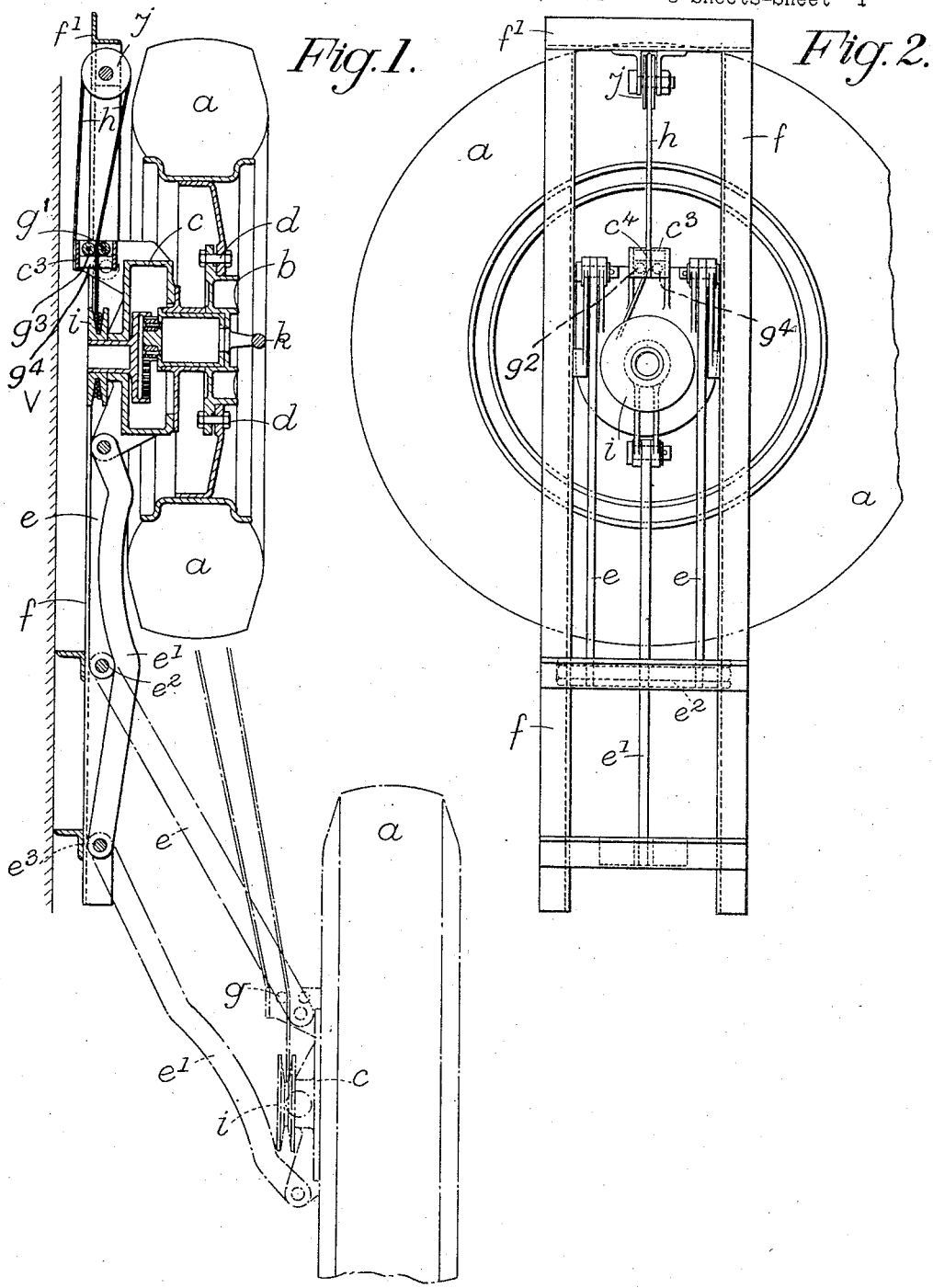

Sept. 27, 1932.  D. S. KENNEDY ET AL  1,879,304
SPARE TIRE CARRIER FOR ROAD VEHICLES
Filed March 5, 1931   3 Sheets-Sheet 1

Sept. 27, 1932.  D. S. KENNEDY ET AL  1,879,304
SPARE TIRE CARRIER FOR ROAD VEHICLES
Filed March 5, 1931    3 Sheets-Sheet 2
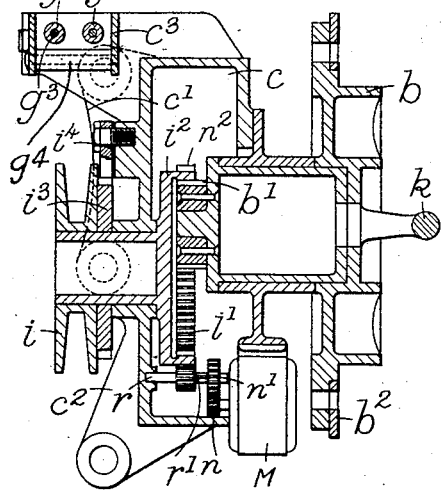
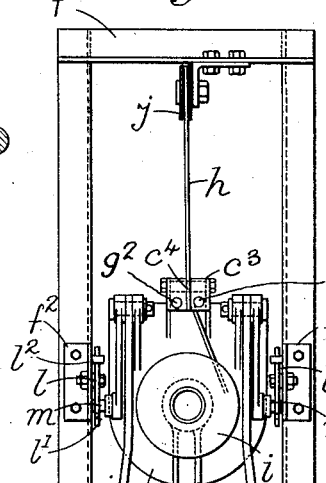
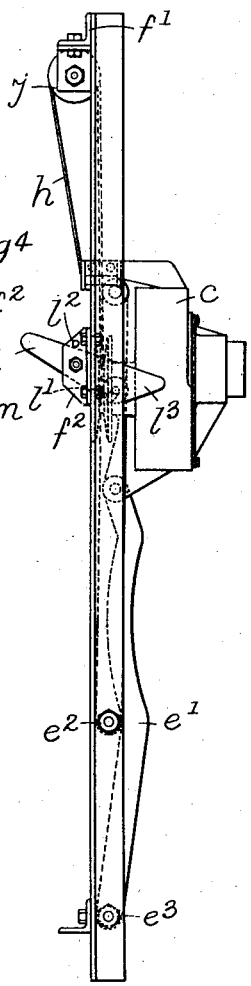
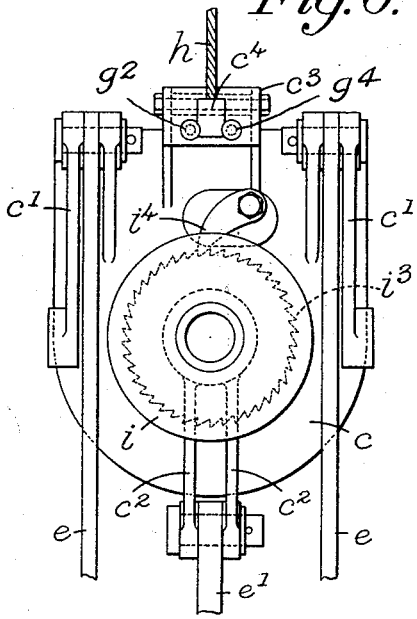

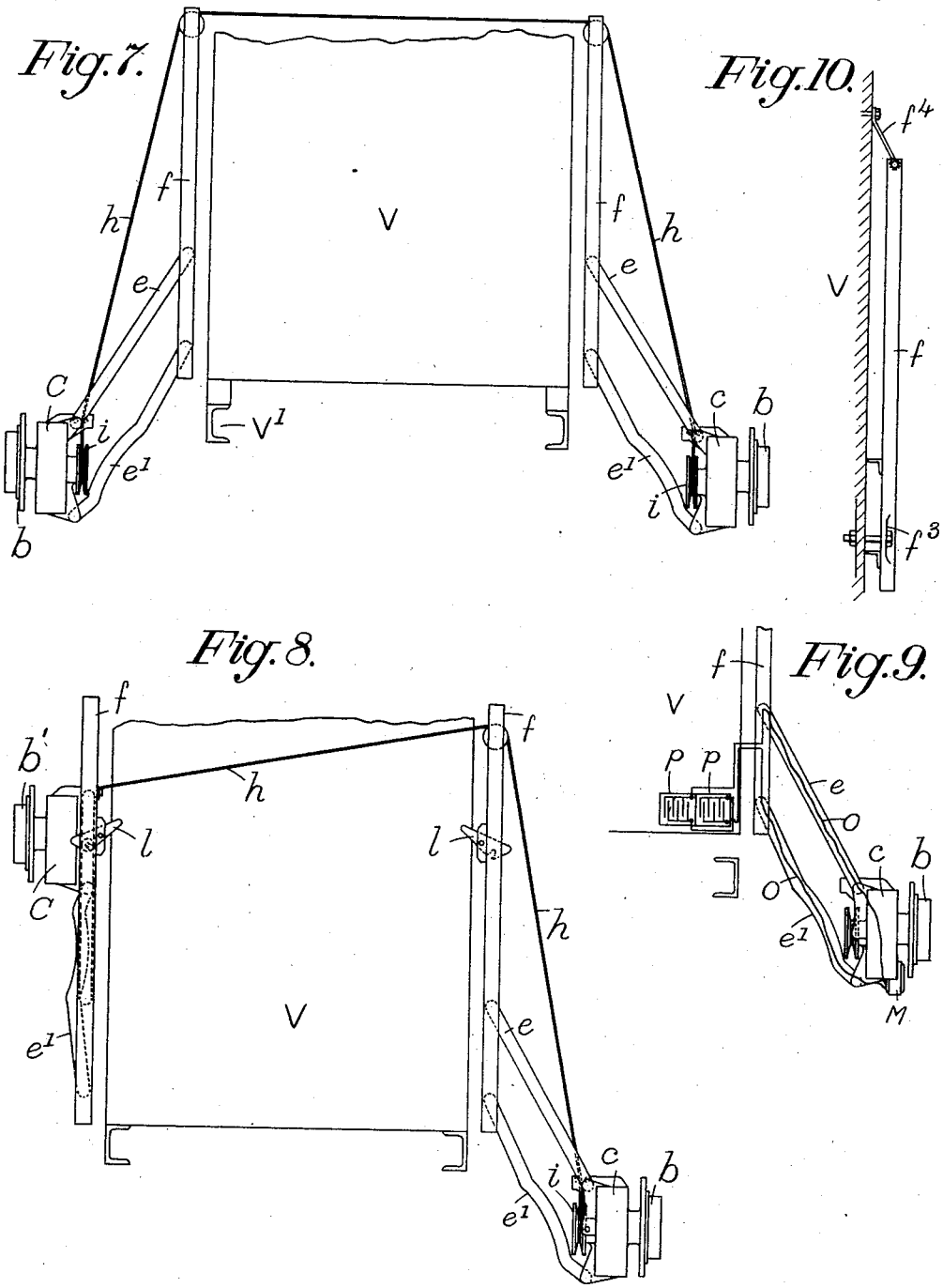

Patented Sept. 27, 1932

1,879,304

UNITED STATES PATENT OFFICE

DONALD STUART KENNEDY AND IRWIN TREVANION KEMPE, OF LONGPARISH, ENGLAND

SPARE TIRE CARRIER FOR ROAD VEHICLES

Application filed March 5, 1931, Serial No. 520,336, and in Great Britain April 17, 1930.

This invention has reference to a device for carrying spare wheels (or rim-fitted tires) on road vehicles. It is particularly applicable to automobile trucks or heavy vehicles fitted with either removable wheels or removable rims having giant pneumatic tires; these large tires are extremely heavy so that it is not only difficult to house them on the vehicle but even more difficult to handle them, that is to say, to hoist them into the storage position and to bring them from their storage place on the vehicle when it becomes necessary to change a damaged wheel or tire.

One object of the present invention is to provide a simplified and compact device which will enable these heavy spare wheels or rim-fitted tires to be handled effectively and quickly. Another object is to provide a support for the spare wheel which can be swung out from the vehicle by means provided upon the support and yet remain parallel to the side of the vehicle throughout the swinging operation. Further objects are to provide a power-operated device of this character, to provide a self-contained unit for attachment to an existing vehicle, to latch the device automatically in the travelling (or storage position), and to render the device self-sustaining when lifting a spare wheel, or the damaged wheel, to the storage position.

The invention is hereafter described with reference to the accompanying drawings, in which:—

Figure 1 is an elevation, partly in section, showing the device attached to the side of the cab of a motor road vehicle, with a spare wheel in the upper (travelling) position upon the device, the wheel being also shown in chain lines in its lowered position.

Figure 2 is a view of the device seen at right angles to Figure 1. Figure 3 is an enlarged view in section, of the support showing a revoluble hub and cable-engaging pulley and a motor for rotating said pulley. Figures 4 and 5 are front and side elevations showing an automatic latching device. Figure 6 is an enlarged elevation showing the cable-engaging pulley fitted with a ratchet sustaining device. Figure 7 is a diagram showing two of these carrier devices with a single cable between them, each support having a revoluble hub. Figure 8 is a diagram showing two carrier devices, only one of which has a revoluble hub and pulley. Figure 9 is a diagram showing leads for current to an electric motor on the support. Figure 10 shows attachment lugs or brackets upon an outer frame.

The spare wheel or the rim-fitted tire $a$ is detachably connected with the hub $b$ of the displaceable holder or support $c$ by mechanical devices, such as nuts and bolts $d$, which preferably are similar to those employed to secure the spare wheel to the hub, disk or like member of the road wheel. The wheel $a$ is thus mounted flat against the holder or support $c$.

This laterally displaceable support $c$ may consist of a plate, frame or the like which is pivotally attached to the upper ends of a plurality of parallel links $e$ $e^1$ which are also pivoted at their normally lower ends as at $e^2$ $e^3$ to an outer fixed frame or housing $f$. The support $c$ is shown provided with webs $c^1$ $c^2$, the former being pivotally attached to the two links $e$ $e$ and the latter being pivotally attached to the link $e^1$. This frame or housing $f$ may be bolted or otherwise secured to the cab chassis or bodywork of the vehicle V, for example through the lugs $f^3$ Figure 10, and when only its lower end can be conveniently bolted in place, as upon the side of a chassis, any suitable form of strut or tie-rod $f^4$ may be used, as will be obvious.

In the arrangement illustrated, the link $e^1$ is arranged between two links $e$ $e$ and whilst the links $e$ $e$ are shown rectilinear, the link $e^1$ is cranked or bowed to clear the pivot $e^2$ when the links are in their upper position.

Whilst we have shown three pivoted links $e$ $e$ $e^1$, it is to be understood that two or more parallel links may be employed. They act in the manner of a parallel-rule device inside the outer frame or housing $f$ and enable the support to be swung from the side of the vehicle. The pivots $e^2$ $e^3$ form pivotal connections between the links $e$ $e$ and the vehicle and about which the links $e$ $e$ $e^1$ and support $c$ can be swung. During this swinging movement, the support $c$ remains parallel with the side of the vehicle.

The support $c$ is provided with two rollers $g$ $g^1$ carried by spindles $g^3$ set across a collar $c^3$ formed with or mounted upon the support $c$, and with a second pair of rollers $g^2$ $g^4$ mounted in a similar manner below and at right angles to the rollers $g$ $g^1$, all these rollers serving to guide a cable $h$ which passes through the collar $c^3$ to be wound upon a revoluble member such as a grooved pulley $i$ mounted in the holder $c$. This pulley $i$ is upon the rear side of the holder $c$ and is connected with a drum or the like forming a false hub $b$ upon the front of the support, so that as the hub $b$ is rotated, the pulley $i$ is simultaneously rotated. This false hub $b$ carries the spare wheel or rim-fitted tire. When the spare wheel $a$ has been secured upon the hub $b$, as by bolts and nuts $d$, and is manually rotated, the pulley $i$ will be correspondingly revolved and will wind up the cable $h$ on the pulley or will allow the cable to be unwound from the pulley $i$. In either case, the pulley $i$ travels along the cable $h$ as a result of the rotation of hub $b$, and this pulley $i$ alters and controls the position of the support $c$ along the cable.

This controlling pulley $i$ is shown provided on its inside flange with a ratchet wheel $i^3$ engaged by a pivoted pawl $i^4$ so that the pulley is self-sustaining, when raising the support $c$. The pawl $i^4$ may be lifted when it is desired to free the pulley for lowering purposes.

Instead of rotating the hub $b$ by manual effort upon the tire, the hub can obviously be rotated by a detachable crank handle engaging, for example, a boss on the hub $b$.

The end of the cable $h$ remote from that secured to the controlling pulley $i$ is shown anchored at $c^4$ to the support $c$ after passing over a purchase pulley $j$ mounted in a fixed position such as on the cross member $f^1$ of the outer frame $f$. This pulley $j$ is between the anchorage $c^4$ and the pulley $i$, along the run of the cable $h$.

In the upper half of Figure 1, the link-mounted support $c$ for the spare wheel $a$ is shown in its travelling position substantially flat against the side of the cab, the cable $h$ being wound up on the pulley $i$, and the cable bearing against the rollers $g^1$ and $g^3$. In the lower half of Figure 1, the spare wheel $a$ (shown in chain lines) is assumed to have been rotated manually so as to unwind the cable from the controlling pulley $i$, and the pivoted links $e$ $e$ $e^1$ have swung outwardly and downwardly about their pivotal connections $e^2$ $e^3$ with the vehicle to bring the displaceable holder or support $c$ carrying the wheel $a$, to a grounded position, the cable $h$ now bearing against rollers $g$ and $g^4$.

When in this grounded position, the wheel $a$ can be easily removed from the hub $b$ after disconnecting the nuts and bolts $d$; the damaged wheel replaced by the spare wheel can afterwards be mounted on the support $c$ and be hoisted to the travelling position by again manually rotating the damaged wheel but this time in the opposite direction, so as to wind up the cable $h$ on pulley $i$ (the pulley travelling along cable $h$) and so raise the damaged wheel on the support $c$ to the upper or storage position.

It will be observed that the purchase pulley $j$ provides for the varying angular inclination of cable $h$ between its two extreme positions and that one or other of the rollers $g$ $g^1$ and one or other of the lower rollers $g^2$ $g^4$ bear against the cable as it passes through collar $c^3$.

We have shown between pulley $i$ and hub $b$ (see Figure 3), a reduction gear comprising a pinion $b^1$ meshing with an internally toothed ring $i^1$ upon a flanged extension $i^2$ from the pulley $i$. The bearings for the hub $b$ and pulley $i$ may be ball or roller, if desired.

We have also shown a T-shaped handle $k$ upon the front of the holder or support $c$, to assist in lifting the wheel to clear the ground and so to facilitate manual rotation of the wheel $a$.

In Figures 4 and 5, we show on the frame $f$ two weighted lever catches $l$ $l$ pivoted in brackets $f^2$ upon the frame $f$, these lever catches having notches or hooks $l^1$ $l^1$ in their lower or heavier arms $l^3$ $l^3$ to engage oppositely extending pins $m$ $m$ provided upon the support $c$ and thereby latch the support in the travelling or storage position. As the support is brought up to its travelling position, the pins $m$ $m$ automatically enter the retaining notches $l^1$ $l^1$. These lever catches are freed by raising their weighted arms $l^3$. The brackets $f^2$ may be provided with stop pins $l^2$ to limit the fall of the weighted end of the lever. Obviously the levers $l$ $l$ may be pivoted upon the side of the vehicle, if desired.

Where required, an adapter in the form of an annulus $b^2$ (see Figure 3) may be fitted between the hub $b$ and the web or disc of the spare wheel illustrated.

In Figure 1 of the drawings, we have shown the improved carrier device projecting from one side of the vehicle V but obviously it is possible to arrange for two spare wheels to be carried, one of these devices being provided on each side of the vehicle. In that case, see Figure 7, the second similar carrier device associated with the first, may have a flexible connection such as a cable $h$ common to both devices; the cable $h$ is secured at one end to the pulley $i$ of one support $c$ and at the other end to the pulley $i$ of the second support C, the two supports $c$ C being each in turn capable of being lowered outwardly and downwardly from its side of the vehicle.

V which is mounted on the chassis V¹. In this arrangement, the cable h is still anchored upon the vehicle but one pulley i acts as the anchorage of the cable h for the other carrier, and the pulley j can (if desired) be dispensed with, the cable h passing transversely across the vehicle as shown.

It is not, however, necessary that the second of the carrier supports should have a revoluble hub and pulley i. In some cases, see Figure 8, only one support c is provided with a revoluble hub b and pulley i, the other support C having a hub b¹ fixed in position on that support C, and either support c or C can be lowered or raised as a result of the rotation of the one revoluble hub b and cable pulley i, the end of the flexible connection h remote from the revoluble hub b being anchored to the fixed hub b¹ or its frame.

Instead of a grooved pulley i, we may employ any other suitable form of revoluble member upon the support c to engage the cable h or either flexible connection.

Further, the support c may be raised from its lower position to its upper position by power-operated means. For this purpose, we indicate in Figs. 3 and 9, an electric motor M secured in any suitable manner upon the support c, and having a driving pinion n adapted to be brought into mesh, when required, with speed-reducing gear such as spur wheels n¹ meshed with an externally toothed ring n² upon the flanged extension i² from pulley i. This power-operated means is required only when raising the support c and wheel a thereon, so the pinion n must be disconnectible, e. g. by sliding on a spline r¹ upon its spindle r, from the gears n¹. The electric leads oo for the motor M will preferably pass along the links e or e¹, as shown in the diagram of Figure 9. Current may be obtained from accumulators p p carried upon the vehicle V. By this arrangement, the raising of the holder or support c can be power-operated when required, without interfering with manual operation and raising of the link-fitted support c.

It is to be understood that the hub b on the link-fitted support c is so shaped as to take the spare wheel or rim-fitted tire. In the drawings, a disc wheel a is fitted but obviously spoked wheels can be employed, the hub b or b¹ then engaging the centre ring of the spoked wheel and being secured thereon in any usual manner.

In the appended claims we wish it to be understood that the expression "mounted spare tire" includes both a spare wheel fitted with a tire and a removable rim fitted with a tire.

What we claim is:—

1. A device of the character described, comprising a support, a hub revolubly mounted on said support, a rotatable pulley also mounted on said support, said pulley being operatively connected with said revoluble hub, a ratchet wheel secured upon said pulley so as to rotate therewith, a pawl pivoted upon said support and engaging said ratchet wheel, a plurality of parallel links, said links being pivotally connected at one end with the vehicle and at the other end with the said support, and means operated by the rotation of said hub and pulley for moving the links and link-mounted support about the pivotal connections between said links and the vehicle.

2. A device for carrying a mounted spare tire upon an automobile vehicle and for transferring it from its storage position to its grounded position, comprising a fixed frame upon the vehicle, a displaceable support for said spare tire, a plurality of links pivotally attached at one end to said support and at the other end to said fixed frame, an operating hub revolubly arranged upon said support, a controlling member mounted on the support and rotatable with said revoluble hub, and means operated by the rotation of said controlling member and revoluble hub for swinging the links and link-mounted support outwardly and downwardly from the vehicle.

3. A mounted spare tire carrier, adapted to transfer said tire from a storage position on a vehicle to a grounded position comprising a fixed frame upon the vehicle, a displaceable support, parallel link members pivoted at one end to said support and pivotally connected at the other end to said fixed frame, a rotatable hub mounted on said support, a controlling member rotatably mounted on said support, a driving connection between said hub and said controlling member, and means for swinging said link-fitted support about its pivotal connections by the rotation of said hub and controlling member.

4. A carrier device for a mounted spare tire of the giant pneumatic type, comprising a displaceable support, a plurality of parallel link-members, said link-members being secured by pivotal connections at one end to said support and at the other end to the vehicle, a rotatable hub mounted on said support, a controlling pulley also mounted on said support, means for revolving said pulley by the rotation of said hub, and a flexible connection anchored to the carrier device and operatively engaged by said controlling pulley.

5. A mounted spare tire carrier of the type described, comprising a frame adapted to be secured to the side of a vehicle, a displaceable support, parallel link-members pivoted to said support and to said frame, a rotatable hub mounted on said support, said hub adapted to carry the spare tire, a flexible connection having an anchorage at one end upon the support, a purchase pulley over which said flexible connection passes, said purchase pulley being arranged upon the said frame, and a revoluble member also mounted on said support and operatively connected with said rotatable hub, said revoluble member being adapted to engage said flexible connection and to wind itself along said flexible connection.

6. A mounted spare tire carrier for use on an automobile vehicle, comprising a support, upper and lower links arranged between said support and the vehicle, said links each including a pivot at each end, whereby said support can be displaced from a higher to a lower position through a series of parallel positions, a rotatable hub mounted on said support, a revoluble controlling pulley also mounted on said support, a driving connection between said hub and said pulley, a cable anchored at one end to said support, said controlling pulley adapted to engage and to travel along said cable, and guide rollers arranged upon said support, said cable passing between said guide rollers to said revoluble controlling pulley.

7. A device of the character described, comprising a displaceable support, a pair of outer parallel link members, an inner link member arranged between said outer link members, all said link members having pivotal connections at one end with said support, an outer frame adapted to be attached to the vehicle, pivotal connections carried by said outer frame for the other ends of said link members, the pivotal connections of the inner link member being at lower levels than those of the outer link members, an upper cross member on said outer frame, a purchase pulley mounted on said cross member, a rotatable hub mounted on said support, a revoluble controlling pulley arranged on said support and operatively connected with said rotatable hub, a flexible connection, said flexible connection being secured at one end to said displaceable support and passing over said purchase pulley, said flexible connection being engaged with and wound upon said revoluble controlling pulley.

8. A device of the character described, including a support, a false hub revolubly mounted on said support, said hub adapted to carry the spare tire, a rotatable controlling pulley also mounted on said support, said pulley being operatively connected with said revoluble false hub, means for holding said controlling pulley against backward rotation, a plurality of parallel links pivotally connected at one end with the vehicle and at the other end with the said support and means for swinging the link-mounted support about its pivotal connections by the rotation of said false hub and controlling pulley.

9. A device of the character described, comprising a displaceable support, a hub revolubly mounted on said support, said hub adapted to carry the spare tire, a rotatable pulley also mounted on said support, a reduction gear arranged between said hub and said pulley, said pulley being operatively connected with said revoluble hub through said reduction gear, a ratchet wheel secured on said pulley, a pawl pivoted on said support and engaging said ratchet wheel, a plurality of links, pivotal connections between one end of said links and the vehicle, pivotal connections between the other end of said links and said displaceable support, and means operated by the rotation of said hub and pulley for moving said links and said link-mounted support about the pivotal connections between said links and the vehicle.

10. In a motor road vehicle, in combination, a displaceable support having a revoluble hub and a rotatable pulley mounted thereon, said hub and pulley being rotatable together, a plurality of parallel links, said support being pivoted upon the outer ends of said links, the inner ends of said links being pivotally connected with one side of the road vehicle, a second displaceable support having a revoluble hub and a rotatable pulley mounted thereon, said second hub and pulley being rotatable together, a second set of parallel links, said second displaceable support being pivoted upon the outer ends of said second set of links, the inner ends of said second set of links being pivotally connected with the other side of the vehicle, each of said hubs adapted to carry a mounted spare tire, means for holding each of said pulleys against backward rotation, and a flexible connection arranged transversely of the vehicle and anchored at one end to said first rotatable pulley and at its opposite end to said second rotatable pulley, so that either of said pulleys can travel along said flexible connection.

In testimony whereof we hereto affix our signatures.

DONALD STUART KENNEDY.
IRWIN TREVANION KEMPE.